(12) United States Patent
Beck et al.

(10) Patent No.: US 9,353,834 B2
(45) Date of Patent: May 31, 2016

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Christian Sibla, Fredrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/646,644

(22) PCT Filed: Oct. 24, 2013

(86) PCT No.: PCT/EP2013/072223
§ 371 (c)(1),
(2) Date: May 21, 2015

(87) PCT Pub. No.: WO2014/079640
PCT Pub. Date: May 30, 2014

(65) Prior Publication Data
US 2015/0292599 A1    Oct. 15, 2015

(30) Foreign Application Priority Data
Nov. 21, 2012   (DE) .......................... 10 2012 221 239

(51) Int. Cl.
*F16H 3/66* (2006.01)

(52) U.S. Cl.
CPC .................. *F16H 3/66* (2013.01); *F16H 3/666* (2013.01); *F16H 2200/0008* (2013.01); *F16H 2200/0065* (2013.01); *F16H 2200/201* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 6,962,548 B2 | 11/2005 | Bucknor et al. | |
| 7,828,688 B2 | 11/2010 | Phillips et al. | |
| 2005/0181906 A1 | 8/2005 | Park | |
| 2007/0298926 A1* | 12/2007 | Raghavan | F16H 3/66 475/276 |
| 2008/0242483 A1* | 10/2008 | Hart | F16H 3/66 475/276 |
| 2009/0305837 A1 | 12/2009 | Hiraiwa | |
| 2009/0312140 A1* | 12/2009 | Jang | F16H 3/666 475/275 |
| 2010/0035718 A1 | 2/2010 | Saitoh | |

FOREIGN PATENT DOCUMENTS

DE    10 2011 052436    5/2012
WO    WO 2008/148253 A1    12/2008

OTHER PUBLICATIONS

PCT Search Report, Jan. 28, 2014.
German Search Report, Jul. 16, 2013.

* cited by examiner

*Primary Examiner* — Justin Holmes
(74) *Attorney, Agent, or Firm* — Dority & Manning, P.A.

(57) ABSTRACT

A transmission includes a drive shaft, an output shaft, a housing, three planetary gear sets, six shift elements, comprising a first brake, a second brake along with a first clutch, a second clutch, a third clutch and a fourth clutch. The shift elements are selectively actuated, by which nine forward gears and one reverse gear are realized. The drive shaft and the output shaft are arranged in a manner axially offset to each other, and the drive shaft is connectable through the first clutch to the second brake and through the second clutch to the sun gear of the second planetary gear set and to the sun gear of the third planetary gear set, whereas the sun gear of the second planetary gear set and the sun gear of the third planetary gear set are also connected to each other.

16 Claims, 11 Drawing Sheets

| (gear) | (engaged shifting elements) | | | | | | (ratio) | (step) |
|---|---|---|---|---|---|---|---|---|
| | (brake) | | (clutch) | | | | | |
| | B1 | B2 | K1 | K2 | K3 | K4 | i | φ |
| 1 | × | | | × | | × | 4.333 | |
| 2 | × | | × | | | × | 2.586 | 1.675 |
| 3 | | | × | × | | × | 1.667 | 1.552 |
| 4 | | | | × | × | × | 1.267 | 1.316 |
| 5 | | | × | × | × | | 1.000 | 1.267 |
| 6 | × | | × | | × | | 0.808 | 1.237 |
| 7 | × | | | × | | × | 0.709 | 1.140 |
| 8 | × | × | | | × | | 0.600 | 1.182 |
| 9 | | × | | × | | × | 0.496 | 1.210 |
| R | | × | | × | | × | -3.167 | (total) 8.741 |
| 4-I | | × | | | × | × | 1.267 | |
| 4-II | × | | | | × | × | 1.267 | |
| 4-III | | | × | | × | × | 1.267 | |

Fig. 11

TRANSMISSION FOR A MOTOR VEHICLE

FIELD OF THE INVENTION

The present invention relates to a transmission, in particular for use in motor vehicles.

BACKGROUND

Here, a transmission in particular designates a multi-gear transmission, with which a predefined number of gears, thus fixed transmission ratio relationships between transmission input and transmission output, is automatically shiftable through shift elements. Here, the shift elements comprise, for example, clutches or brakes.

DE 10 2008 032 015 discloses a powershift transmission with ten forward gears and one reverse gear. Thereby, the powershift transmission features three planetary gear sets, which are able to be shifted with each other in various combinations through six torque-transferring devices, two of which are fixed connections and four of which are clutches. A torque is initiated through a start-up element in the powershift transmission, and is transferred to an output element while taking into account the respective transmission ratio relationship. Thereby, the drive element and the output element are arranged coaxially to each other.

SUMMARY OF THE INVENTION

The present invention is subject to a task of proposing a transmission of the aforementioned type, which features small gear steps with a large gear spread, which at the same type optimizes installation space and/or features a high degree of efficiency. Additional objects and advantages of the invention will be set forth in part in the following description, or may be obvious from the description, or may be learned through practice of the invention.

A "gear spread" is understood to mean the quotient from the transmission ratio relationship of the lowest gear and the transmission ratio relationship of the highest gear, whereas the lowest gear features the largest transmission ratio relationship, and the highest gear features the smallest transmission ratio relationship. If there is a transmission ratio relationship of i<1.0, a transmission ratio into fast mode takes place; that is, at the transmission output, a higher rotational speed than that at the transmission input is applied.

In accordance with the invention, the tasks are solved with a transmission as described and claimed herein.

The transmission comprises at least one drive shaft, one output shaft, one housing and six shift elements. It is particularly preferable that, through the drive shaft, a torque or a rotational movement of a drive source, such as an internal combustion engine, is initiated in the transmission. In a preferred manner, a start-up element, such as a hydrodynamic torque converter or a fluid clutch, is located between the drive source and the drive shaft.

In the following, a "shaft" is not solely understood as an exemplary cylindrical, rotatably mounted machine element for the transfer of torques, but is also understood as a general connection element, which connects individual components or elements to each other, in particular connection elements that connect several elements to each other in a torque-proof manner.

In particular, two elements are described as connected to each other if there is a fixed (in particular, a torque-proof) connection between the elements. In particular, such connected elements rotate with the same rotational speed.

Furthermore, two elements are described as connectable if there is a detachably torque-proof connection between such elements. In particular, such elements rotate if the connection exists with the same rotational speed.

The various components and elements of the specified invention may be connected to each other through a shaft or a connection element, or also directly, for example by means of a welded connection, crimping connection or another connection.

It is particularly preferable that the six shift elements comprise a first brake, a second brake, a first clutch, a second clutch, a third clutch and a fourth clutch.

Thereby, clutches describe shift elements that, depending on their operating state, allow for a relative movement between two components or represent a connection for the transfer of a torque. A "relative motion" is understood as, for example, a rotation of two components, where the rotational speed of the first component and the rotational speed of the second component differ from each other. In addition, the rotation of only one of the two components is conceivable, while the other component is at a standstill or rotates in the opposite direction.

In the following, a "non-actuated clutch" is understood as an open clutch. This means that a relative motion between the two components is possible. With an actuated or locked clutch, the two components rotate accordingly with the same rotational speed and in the same direction.

A "brake" is understood as a shift element that is connected on one side to a fixed element, such as a housing, and on another side to a rotating element. In the following, a "non-actuated brake" is understood as an open brake. This means that the rotating component is in free-running mode, which means that the brake preferably does not affect the rotational speed of the rotating component. With an actuated or locked brake, a reduction of the rotational speed of the rotating component up to a stop takes place, which means that a connection between the rotating element and the fixed element can be established.

As a general rule, the use of shift elements that are locked in a non-actuated state and open in an actuated state is also possible. Accordingly, the allocations between function and shifting state of the shifting states described above are understood in reverse order. With the following embodiments, an arrangement in which an actuated shift element is locked and a non-actuated shift element is open is initially used as the basis.

The transmission also comprises a first planetary gear set, a second planetary gear set and a third planetary gear set.

Thereby, a planetary gear set comprises a sun gear, a planetary carrier and a ring gear. Planetary gears that mesh with the toothing of the ring gear and/or with the toothing of the sun gear are rotatably mounted on the planetary carrier. In the following, a negative planetary gear set describes a planetary gear set with a planetary carrier on which the planetary gears are rotatably mounted, with a sun gear and a ring gear, whereas the toothing of at least one of the planetary gears meshes with both the toothing of the sun gear and with the toothing of the ring gear, by which the ring gear and the sun gear rotate in opposite directions, if the sun gear rotates with a fixed planetary carrier.

A positive planetary gear set differs from the negative planetary gear set just described in that the positive planetary gear set features inner and outer planetary gears, which are rotatably mounted on the planetary carrier. Thereby, the toothing of the inner planetary gears meshes, on the one hand, with the toothing of the sun gear and, on the other hand, with the toothing of the outer planetary gears. The toothing of the outer planetary gears also meshes with the toothing of the ring gear. This has the consequence that, with a fixed planetary carrier, the ring gear and the sun gear rotate in the same direction of rotation.

A particularly compact transmission can be realized through the use of planetary gear sets, by which a high degree of freedom in the arrangement of the transmission in the vehicle is achieved.

In particular, the sun gear, the ring gear, the planetary carrier and the planetary gears of the planetary gear set are understood as elements of a planetary gear set.

It is particularly preferable that the shift elements are able to be actuated selectively, thus individually and in line with demand, by which nine forward gears and one reverse gear can be realized through different transmission ratio relationships between the drive shaft and the output shaft. Based on the numerous gears, it is possible to realize a fine gear shifting with a large gear spread, and thereby, for example, to operate the internal combustion engine in an optimal rotational speed range, and thus efficiently. At the same time, this contributes to increased driving comfort, since the internal combustion engine preferably can be operated at a low rotational speed level. Thus, for example, noise emissions that arise through the operation of the internal combustion engine are reduced.

It is also preferable that the drive shaft and the output shaft are arranged in a manner axially offset to each other. This leads, for example, to a particularly low need for axial installation space for the transmission. Thereby, the transmission is suitable, in a particularly preferable manner, for use in a vehicle with a front-transverse arrangement of the drive train.

"Front-transverse arrangement of the drive train" is understood to mean that the drive source, such as an internal combustion engine, is installed in the vehicle transverse to the direction of travel, and that, preferably, the wheels of the front axle are drivable by the drive source or the transmission.

It is particularly preferable that all elements of the first planetary gear set, the second planetary gear set and the third planetary gear set are rotatable. This means that there is no permanent connection between the elements of the planetary gear sets and a fixed element, such as the housing; rather, a connection can be selectively established through the actuation of the shift elements. Thereby, a blocking of the individual elements of the planetary gear sets can be produced only through the actuation of the respective shift elements. This also advantageously contributes to the fact that, by means of a low number of planetary gear sets, a high number of gears can be realized.

In the following, "connectable" is understood to mean that a detachable connection can be established between two elements. For example, this means that it is preferable that, through shift elements, depending on their operating state, there is a torque-proof connection between two elements for the transfer of rotational movement, or that the two elements are rotationally decoupled from each other. In this case, a transfer of a rotational movement does not take place.

In contrast to this, "connected" is understood to mean that a permanent fixed connection between two elements exists, by which, for example, a rotational movement is constantly transferable from the one component to the other component.

It is also preferable that the drive shaft is connectable to the second brake through the first clutch. In addition, the drive shaft preferably is, through the second clutch, connectable to the sun gear of the second planetary gear set and to the sun gear of the third planetary gear set. It is particularly preferable that the sun gear of the second planetary gear set and the sun gear of the third planetary gear set are also connected to each other. This achieves a multitude of degrees of freedom with respect to the planetary gear sets, such that a multitude of gears with the use of relatively few shift elements and planetary gear sets is feasible.

It is particularly preferable that the three planetary gear sets, beginning at the transmission input in the order of first planetary gear set, second planetary gear set, third planetary gear set, are arranged coaxially to the drive shaft. In addition, it is particularly preferable that the shift elements are arranged so that they are easily accessible from the outside.

The degree of efficiency of the transmission may be preferably increased by the fact that, for the shift elements, energy is necessary for the change to the shifting state, but not for maintaining the shifting state itself. Here, actuated shift elements in line with demand, such as electromechanical shift elements or electromagnetic shift elements, are suitable in a particular way. Particularly when compared to conventional hydraulically actuated shift elements, they are characterized by a particularly low and efficient energy demand, since they can be operated nearly loss-free. In addition, with the solution specified above, it is advantageous that permanently holding a control pressure for the actuation of the (for example) conventional hydraulic shift elements, and/or permanently applying the shift element in the locked state with the required hydraulic pressure, can be avoided. Thereby, additional components such as a hydraulic pump (for example) may be omitted, to the extent that they are solely used for the control and supply of conventional hydraulically actuated shift elements. If the additional components are supplied with lubricant by the same hydraulic pump, and not by a separate lubrication pump, at least this can be dimensioned smaller. Moreover, any leaks at the oil transfer points of the hydraulic circuit that may arise, particularly with rotating components, are eliminated. It is particularly preferable that this also contributes to increased efficiency of the transmission in the form of a higher degree of efficiency. Upon the use of actuated shift elements in line with demand of the type specified above, it is particularly advantageous if they are accessible from the outside. Among other things, that has the advantage that the required shifting energy can be easily fed to the shift elements. Therefore, the shift elements are, particularly preferably, arranged so that they are easily accessible from the outside. Within the meaning of the shift elements, "easily accessible from the outside" means that no additional components are arranged between the housing and the shift element, and/or that the shift elements are, particularly preferably, arranged on the output shaft or on the drive shaft.

A transmission input thereby describes a location on a transmission at which, in driving mode, a torque is initiated by the drive source in the transmission. In contrast to this, a "transmission output" is understood to mean a location on the transmission at which the torque, taking into account the corresponding transmission ratio relationships (for example, in a transfer case) is initiated or transferred to the drive shafts of the vehicle.

It is also preferable that the ring gear of the second planetary gear set is connected to the first brake. This arrangement enables, among other things, the outer side of the ring gear to act, for example, as a multi-disk carrier, which meshes with the first brake. On the one hand, this leads to a reduction in the number of components used in the transmission since, for example, an additional connection element can be avoided; on the other hand, this arrangement represents a solution that is optimized particularly with respect to the required installation space.

In an additional preferred embodiment, the transmission features a first spur pinion and a second spur pinion. By means of the first spur pinion and the second spur pinion, a torque is transferable to the output shaft, depending on the actuation of the shift elements. Through this arrangement, the transmission is suitable, in a particularly preferable manner, for use in vehicles with a front-transverse arrangement of the drive train, since a lower need for axial installation space is required by the axially offset arrangement of the drive shaft and the output shaft. This is of particular importance for vehicles with a front-transverse arrangement of the drive train, since the available installation space for the drive source and the transmission is, in a particular manner, limited by the width of the vehicle. However, other arrangements of the drive train (for example, for rear-wheel drive vehicles) are conceivable.

A spur pinion comprises a single-stage or multi-stage spur gearbox with at least two spur gears, which mesh with each other. Thereby, the respective shafts of the spur gears and/or the rotation axes of the shafts and spur gears are arranged parallel to each other.

The two spur pinions are arranged between the first planetary gear set and the second planetary gear set along the drive shaft, beginning at the transmission input, in the order of first spur pinion, second spur pinion, first planetary gear set, whereas at least one spur gear of the first spur pinion and one spur gear of the second spur pinion are arranged coaxially to the drive shaft. This arrangement provides a space-saving design, since the individual planetary gear sets and shift elements can be easily nested in one another and, for example, the various shafts with this arrangement do not cross each other. To the extent that this allows for the binding ability of the elements, a geometric positioning of the individual gear sets, shift elements and spur pinions that deviates from the arrangement just described is conceivable, to the extent that the change to the geometric positioning of the components occurs coaxially to the drive shaft.

"Binding ability" is understood to mean that, with a different geometric positioning, thus an arrangement of components that deviates from the arrangement just described, the same binding or connection of the interfaces is ensured, without the individual connection elements or shafts crossing each other.

Moreover, the use of a chain drive or a belt in place of the first spur pinion or the second spur pinion is conceivable.

It is particularly preferable that the first clutch, the second clutch and the third clutch are connected to the drive shaft on one side. This allows the first clutch, the second clutch and the third clutch to be arranged next to each other, coaxially to the drive shaft. Thereby, the first clutch, the second clutch and the third clutch are, in a particular manner, easily accessible from the outside.

In an additional preferred embodiment, each of the three planetary gear sets is connectable to the drive shaft at least through the first clutch, the second clutch or the third clutch. This means that each of the planetary gear sets is connectable, at least with one element, to the drive shaft directly through a first clutch.

It is also preferable that each of the first planetary gear set, the second planetary gear set and the third planetary gear set is designed as a negative planetary gear set. In a particular manner, this arrangement proves to be a cost-effective option for realization. At the same time, this arrangement features a high degree of efficiency with respect to the gear set, since, compared to positive planetary gear sets, negative planetary gear sets feature an improved degree of efficiency.

In an additional preferred embodiment, the first planetary gear set and the second planetary gear set are designed negative planetary gear sets, while the third planetary gear set is designed as a positive planetary gear set. This arrangement represents an alternative structural shape to the use of negative planetary gear sets for all planetary gear sets. In addition, this arrangement enables the use of the outer radius of the ring gear of the third planetary carrier as a multi-disk carrier at the same time. This has the particularly advantageous result that no additional connection element is necessary between the ring gear of the third planetary gear set and the second brake, by which an additional angle plate is rendered unnecessary (for example), and installation space can thus be optimized. Moreover, the assembly process is simplified by eliminating possible components.

In an additional preferred form of the arrangement, the drive shaft is connectable to the planetary carrier of the third planetary gear set through the first clutch. In addition, the drive shaft is connectable to the planetary carrier of the first planetary gear set through the third clutch. The sun gear of the first planetary gear set is connected to a second spur pinion and the planetary carrier of the second planetary gear set. Further, the second spur pinion is connectable to the output shaft through the fourth clutch, and the planetary carrier of the second planetary gear set is connected to the ring gear of the third planetary gear set. The ring gear of the first planetary gear set is preferably connected to a first spur pinion, and such first spur pinion is connected to the output shaft.

In an additional preferred embodiment, the drive shaft is connectable to the ring gear of the third planetary gear set through the first clutch. Further, the drive shaft is connectable to the planetary carrier of the first planetary gear set through the third clutch. It is also preferable that the sun gear of the first planetary gear set is connected to a second spur pinion and the planetary carrier of the second planetary gear set. At the same time, the second spur pinion is connectable to the output shaft through the fourth clutch. The planetary carrier of the second planetary gear set is connected to the planetary carrier of the third planetary gear set. Preferably, the ring gear of the first planetary gear set is connected to a first spur pinion, and the first spur pinion is connected to the drive shaft.

In an additional preferred form of the arrangement, the drive shaft is connectable to the planetary carrier of the third planetary gear set through the first clutch. Further, the drive shaft is connected to the planetary carrier of the first planetary gear set. The sun gear of the first planetary gear set is connectable to a second spur pinion and the planetary carrier of the second planetary gear set through the third clutch, while the second spur pinion is connectable to the drive shaft through the fourth clutch, and the planetary carrier of the second planetary gear set is connected to the ring gear of the third planetary gear set. It is also preferable that the ring gear of the first planetary gear set is connected to a first spur pinion, and the first spur pinion is connected to the output shaft.

In an additional preferred embodiment, the drive shaft is connectable to the ring gear of the third planetary gear set through the first clutch. Further, the drive shaft is connected to the planetary carrier of the first planetary gear set. The sun gear of the first planetary gear set is connectable to a second spur pinion and the planetary carrier of the second planetary gear set through the third clutch. The second spur pinion is connectable to the output shaft through the fourth clutch, and the planetary carrier of the second planetary gear set is connected to the planetary carrier of the third planetary gear set. The ring gear of the first planetary gear set is preferably connected to a first spur pinion, and the first spur pinion is preferably connected to the output shaft.

In an additional preferred form of the arrangement, the drive shaft is connectable to the planetary carrier of the third planetary gear set through the first clutch, and is connected to the planetary carrier of the first planetary gear set. It is also preferable that the sun gear of the first planetary gear set is connected to a second spur pinion and the planetary carrier of the second planetary gear set, whereas the second spur pinion is connectable to the output shaft through the fourth clutch, and the planetary carrier of the second planetary gear set is connected to the ring gear of the third planetary gear set. It is also preferable that the ring gear of the first planetary gear set is connectable to a first spur pinion though the third clutch, and the first spur pinion is connected to the output shaft.

In an additional preferred form of the arrangement, the drive shaft is connectable to the ring gear of the third planetary gear set through the first clutch, and is connected to the planetary carrier of the first planetary gear set. It is also preferable that the sun gear of the first planetary gear set is connected to a second spur pinion and the planetary carrier of the second planetary gear set, whereas the second spur pinion is connectable to the output shaft through the fourth clutch, and the planetary carrier of the second planetary gear set is connected to the planetary carrier of the third planetary gear set. It is also preferable that the ring gear of the first planetary gear set is connectable to a first spur pinion through the third clutch, and the first spur pinion is connected to the output shaft.

In an additional particularly preferable embodiment, the drive shaft is connectable to the planetary carrier of the third planetary gear set through the first clutch. Further, the drive shaft is connected to the planetary carrier of the first planetary gear set. Preferably, the sun gear of the first planetary gear set is connected to a second spur pinion and the planetary carrier of the second planetary gear set. The second spur pinion is also connectable to the output shaft through the fourth clutch, and the planetary carrier of the second planetary gear set is connected to the ring gear of the third planetary gear set. Preferably, the ring gear of the first planetary gear set is connected to a first spur pinion, and the first spur pinion is connectable to the output shaft through the third clutch.

In an additional preferred variant of the transmission, the drive shaft is connectable to the ring gear of the third planetary gear set through the first clutch. It is also preferable that the drive shaft is connected to the planetary carrier of the first planetary gear set. The sun gear of the first planetary gear set is preferably connected to a second spur pinion and the planetary carrier of the second planetary gear set, whereas the second spur pinion is connectable to the output shaft through the fourth clutch, and the planetary carrier of the second planetary gear set is connected to the planetary carrier of the third planetary gear set. Preferably, the ring gear of the first planetary gear set is connected to a first spur pinion, and the first spur pinion is connectable to the output shaft through the third clutch.

It is particularly preferable that, in the transmission, the drive shaft is connectable to the planetary carrier of the third planetary gear set through the first clutch. It is also preferable that the drive shaft is connectable to the planetary carrier of the first planetary gear set through the third clutch. The sun gear of the first planetary gear set is connected to the planetary carrier of the second planetary gear set, and is connectable to a second spur pinion through the fourth clutch. The second spur pinion is preferably connected to the output shaft, and the planetary carrier of the second planetary gear set is preferably connected to the ring gear of the third planetary gear set. The ring gear of the first planetary gear set is connected to a first spur pinion, and the first spur pinion is connected to the output shaft.

It is particularly preferable that the drive shaft is connectable to the ring gear of the third planetary gear set through the first clutch. In addition, the drive shaft is connectable to the planetary carrier of the first planetary gear set through the third clutch. The sun gear is preferably connected to the planetary carrier of the second planetary gear set, and is connected to a second spur pinion through the fourth clutch. The second spur pinion is connected to the output shaft, and the planetary carrier of the second planetary gear set is connected to the planetary carrier of the third planetary gear set. The ring gear of the first planetary gear set is preferably connected to a first spur pinion, and the first spur pinion is connected to the output shaft.

It is also preferable that the first forward gear can be represented by the locked first brake, the locked second clutch and the locked fourth clutch. The second forward gear preferably can be represented by the locked first brake, the locked first clutch and the locked fourth clutch. The third forward gear can be represented by the locked first clutch, the locked second clutch and the locked fourth clutch. The fourth forward gear preferably can be represented by the locked second clutch, the locked third clutch and the locked fourth clutch or by the locked second brake, the locked third clutch and the locked fourth clutch or by the locked first brake, the locked third clutch and the locked fourth clutch or by the locked first clutch, the locked third clutch and the locked fourth clutch. The fifth forward gear can be represented by the locked first clutch, the locked second clutch and the locked third clutch. The sixth forward gear can be represented by the locked first brake, the locked first clutch and the locked third clutch. The seventh forward gear can be represented by the locked first brake, the locked second clutch and the locked third clutch. The eighth forward gear can be represented by the locked first brake, the locked second brake and the locked third clutch. The ninth forward gear can be represented by the locked second brake, the locked second clutch and the locked third clutch. The reverse gear can be represented by the locked second brake, the locked second clutch and the locked fourth clutch. The shift elements that are not specified are open in the respective corresponding gear.

In accordance with an additional aspect of the present invention, a method for operating the transmission is proposed. Thereby, in each gear, three shift elements are simultaneously locked, while the remaining shift elements are open. Thereby, a gear change to an adjacent higher gear or to an adjacent lower gear takes place by closing exactly one previously open shift element and by opening exactly one previously locked shift element. Regardless of whether they are able to be actuated hydraulically, electro-mechanically or in any other way, this leads to a lower need for energy of the shift elements, which ultimately has advantageous effects on consumption, for example the consumption of fuel if an internal combustion engine is the drive source of the vehicle. A gear change to an adjacent higher gear or to an adjacent lower gear is carried out accordingly by changing the shifting state of only two shift elements. It is particularly preferable that this contributes to a reduction in shifting times.

The geometric positioning of the individual gear sets and shift elements is freely selectable, as long as this allows for the binding ability of the elements. This means that the individual elements may be arbitrarily moved into their position in the housing, as long as the individual connection elements or shafts do not cross each other. This also means that the planetary gear sets may be arranged radially above one another.

In principle, all shift elements can function in a frictional-locking or positive-locking manner. Primarily, the fourth clutch is, in a particular manner, suitable for the use of a claw shift element. This leads to a significantly improved degree of efficiency, and thus to significant consumption advantages with respect to fuel consumption, for example, for vehicles with internal combustion engines.

In principle, at least one planetary gear set in the present invention may be designed as a positive planetary gear set, if the connection of the planetary carrier and the ring gear of the relevant planetary gear set is adjusted accordingly. The same applies, in reverse order, for the conversion of positive planetary gear sets into negative planetary gear sets.

In principle, on each shaft or each connection element, an electric motor or another power/drive source may also be arranged.

In addition, at each shaft, a freewheel may in principle be arranged at the housing or at another shaft. As a result, the corresponding shift element may be dimensioned smaller, since at least part of the torque is captured through the freewheel.

BRIEF DESCRIPTION OF THE DRAWINGS

The invention is described more specifically by example on the basis of the attached figures. The following is shown:

FIG. 11 is an exemplary shift diagram for a transmission in accordance with FIGS. 1 to 10.

DETAILED DESCRIPTION

Figure 1:
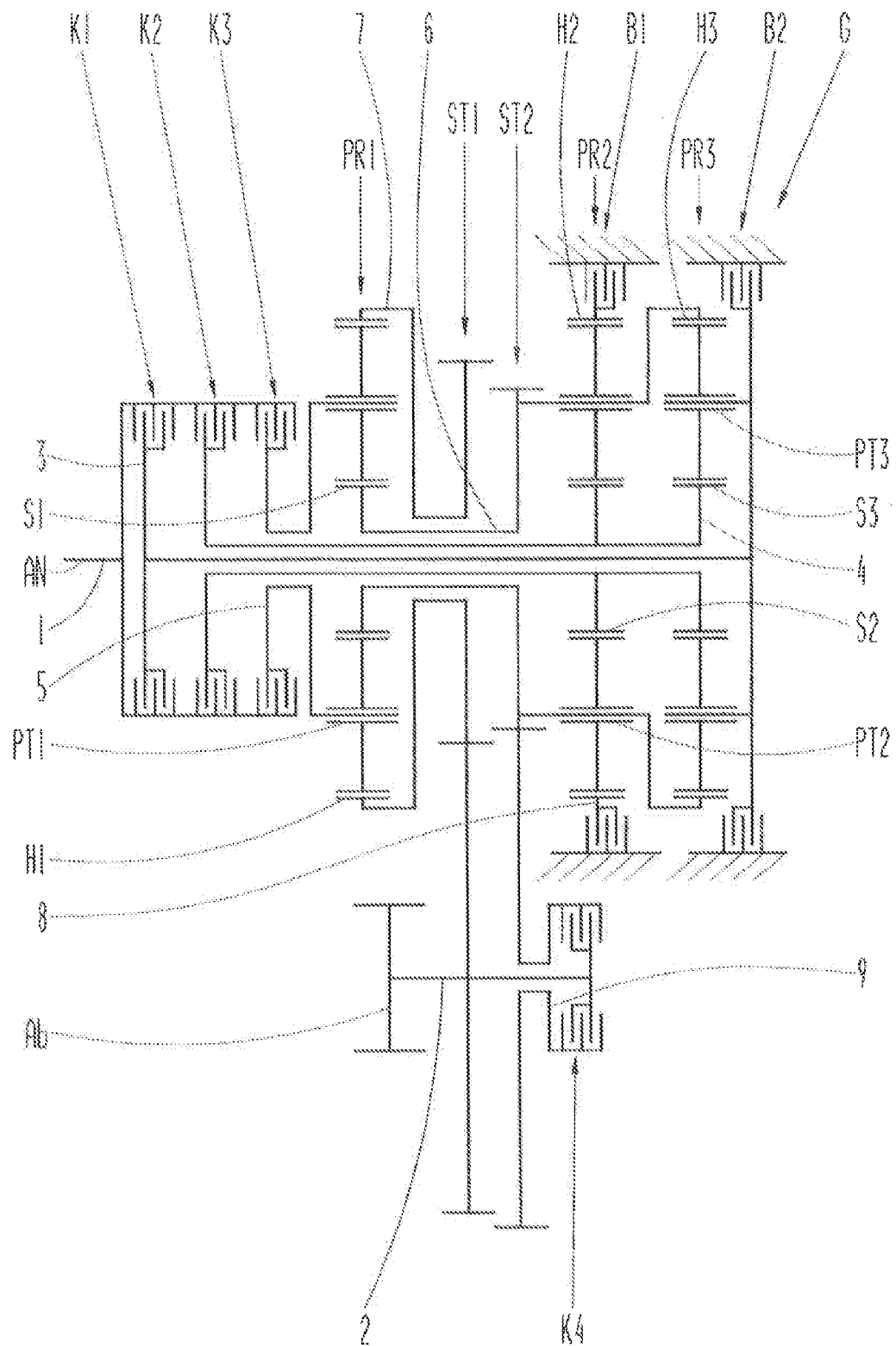
FIG. 1 is a schematic view of a first preferred embodiment of a transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In a schematic presentation, FIG. 1 shows a first preferred embodiment of the transmission, whereas the transmission comprises a first planetary gear set PR1, a second planetary gear set PR2, a third planetary gear set PR3, a first spur pinion ST1, a second spur pinion ST2 and six shift elements, whereas all of the specified elements are arranged in a housing G. The six shift elements comprise a first brake B1, a second brake B2, a first clutch K1, a second clutch K2, a third clutch K3 and a fourth clutch K4. The first brake B1 and the second brake B2 are firmly connected to the housing G on one side. Through a drive shaft 1, a rotational movement or a torque is initiated in the transmission. The initiation of the torque or the rotational movement is carried out at one end of the drive shaft 1, which protrudes from the housing G at a first side of the transmission. On one side, the drive shaft 1 is be connected to the first clutch K1, the second clutch K2 and the third clutch K3. Thereby, the first clutch K1, the second clutch K2 and the third clutch K3 are coaxially arranged, starting at the drive shaft 1, in the order of first clutch K1, second clutch K2, third clutch K3. Additional elements of the transmission are arranged coaxially to the third shaft 3, starting at the third clutch K3, in the order of first planetary gear set PR1, first spur pinion ST1, second spur pinion ST2, second planetary gear set PR2, third planetary gear set PR3, second brake B2, whereas, with respect to each of the first spur pinion ST1 and the second spur pinion ST2, at least one spur gear is arranged coaxially to the drive shaft 1. On the same level, in axial terms, with the second planetary gear set PR2, with respect to the third shaft 3, the first brake B1 is located between the housing G and the second planetary gear set PR2. In parallel arrangement, an output shaft 2 is located in a manner axially spaced to the drive shaft 1 or the third shaft 3, as the case may be. The output shaft 2 has a free end, which protrudes from the housing G. In addition, the first spur pinion ST1, the second spur pinion ST2 and the fourth clutch K4 are arranged coaxially to the output shaft 2, whereas, with respect to each of the first spur pinion ST1 and the second spur pinion ST2, at least one spur gear is arranged coaxially to the output shaft 2. Thereby, the elements feature the order of first spur pinion ST1, second spur pinion ST2, fourth clutch K4. The end of the output shaft 2, which protrudes from the housing G, thereby points in the same direction as the end of the drive shaft 1, which also protrudes from the housing G.

The drive shaft 1 is connectable to the third shaft 3 through the first clutch K1, whereas the third shaft 3 at the same time connects the planetary carrier PT3 of the third planetary gear set PR3 to the second brake B2. Further, the drive shaft 1 is connectable to a fourth shaft 4 through a second clutch K2, whereas the fourth shaft 4 further connects the sun gear S2 of the second planetary gear set PR2 to the sun gear S3 of the third planetary gear set PR3. Through the third clutch K3, the drive shaft 1 is connectable to a fifth shaft 5, whereas the fifth shaft 5 is further connected to the planetary carrier PT1 of the first planetary gear set PR1. The sun gear S1 of the first planetary gear set PR1 is connected to the second spur pinion ST2 through a sixth shaft 6, whereas the second spur pinion ST2 is further connected to a ninth shaft 9. The ninth shaft 9 is connectable to the output shaft 2 through the fourth clutch K4. Likewise, the planetary carrier PT2 of the second planetary gear set PR2 is connected to the sun gear S1 of the first planetary gear set PR1 through the sixth shaft 6, whereas the sixth shaft 6 further connects the planetary carrier PT2 of the second planetary gear set PR2 to the ring gear H3 of the third planetary gear set PR3. The ring gear H1 of the first planetary gear set PR1 is connected to the first spur pinion ST1 through a seventh shaft 7. The ring gear H2 of the second planetary gear set PR2 is connected to the first brake B1 through an eighth shaft 8. Through the first spur pinion ST1 and/or through the second spur pinion ST2, the rotational motion initiated through the drive shaft 1 is transferred to the output shaft 2 with the selected transmission ratio of the various forward gears or the reverse gear, as the case may be.

The first planetary gear set PR1 is designed as a negative planetary gear set. This means that planetary gears of the planetary carrier PT1 mesh with the sun gear S1 and the ring gear H1 of the first planetary gear set PR1. The same applies to the second planetary gear set PR2 or the sun gear S2, the planetary carrier PT2 and the ring gear H2 of the second planetary gear set PR2, and the third planetary gear set PR3 or the sun gear S3, the planetary carrier PT3 and the ring gear H3 of the third planetary gear set PR3.

Figure 2:
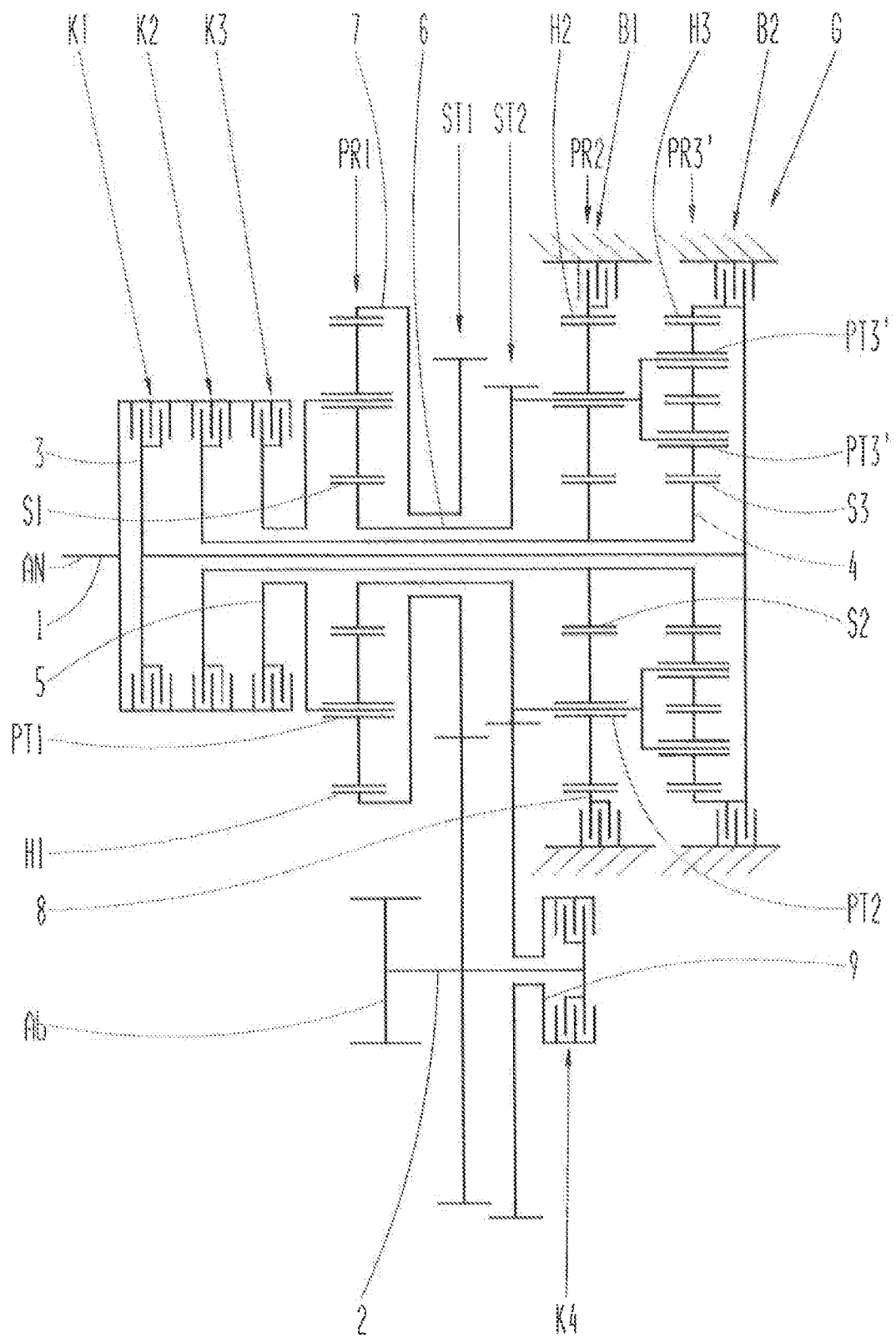
FIG. 2 is a schematic view of a second preferred embodiment of a transmission in accordance with the invention.

FIG. 2 shows an additional embodiment of the transmission described in FIG. 1, which differs from the embodiment described in FIG. 1 particularly to the effect that the third planetary gear set PR3' is designed as a positive planetary gear set. Among other things, this leads to the fact that some interfaces or connections must be reversed and changed. Thus, the drive shaft 1 is still connectable to the third shaft 3 through the first clutch K1, but the third shaft 3 now further connects the ring gear H3 of the third planetary gear set PR3 to the second brake B2. An additional difference arises from the connection of the planetary carrier PT2 of the second planetary gear set PR2. This is still connected to the sun gear S1 of the first planetary gear set PR1 through the sixth shaft 6, but the sixth shaft 6 now further connects the planetary carrier PT2 of the second planetary gear set PR2 to the planetary carrier PT3' of the third planetary gear set PR3'. The remaining connections and interfaces correspond to the arrangement described in FIG. 1. Thus, FIG. 2 presents an alternative embodiment of the arrangement described in FIG. 1.

Figure 3:
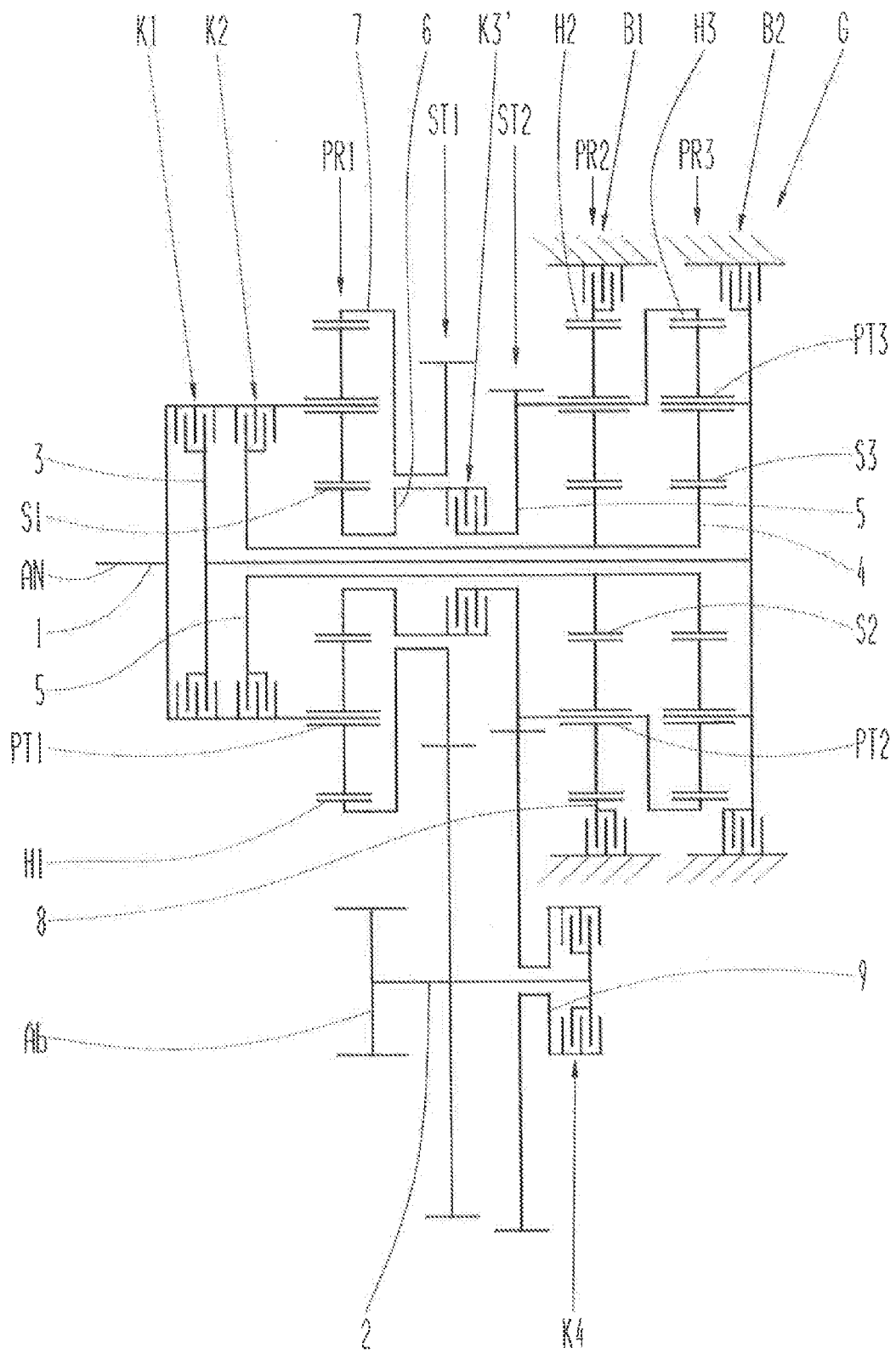
FIG. 3 is a schematic view of a third preferred embodiment of a transmission in accordance with the invention.

FIG. 3 shows an additional variant of the transmission described in FIG. 1. The drive shaft 1 is connectable to the third shaft 3 through the first clutch K1, whereas the third shaft 3 further connects the second brake B2 to the planetary carrier PT3 of the third planetary gear set PR3. Further, the drive shaft 1 is connected to the fourth shaft 4 through the second clutch K2, whereas the fourth shaft 4 further connects the sun gear S2 of the second planetary gear set PR2 to the sun gear S3 of the third planetary gear set PR3. In addition, the drive shaft 1 is firmly connected to the planetary carrier PT1 of the first planetary gear set PR1. The sixth shaft 6 is, on the one hand, connected to the sun gear S1 of the first planetary gear set PR1 and, on the other hand, connectable to the fifth shaft 5 through the third clutch K3', whereas the fifth shaft 5 further connects to the second spur pinion ST2 to the planetary carrier PT2 of the second planetary gear set PR2. The second spur pinion ST2 is further connected to the ninth shaft 9, while the ninth shaft 9 is further connectable to the output shaft 2 through the fourth clutch K4. The planetary carrier PT2 of the second planetary gear set PR2 is further connected to the ring gear H3 of the third planetary gear set PR3 through the fifth shaft 5. The ring gear H1 of the first planetary gear set PR1 is connected through the seventh shaft 7 to the first spur pinion ST1, and this is further connected to the output shaft 2. The ring gear H2 of the second planetary gear set PR2 is connected to the first brake B1 through the eighth shaft 8. In the arrangement described here, each of the first planetary gear set PR1, the second planetary gear set PR2 and the third planetary gear set PR3 is designed as a negative planetary gear set.

Figure 4:
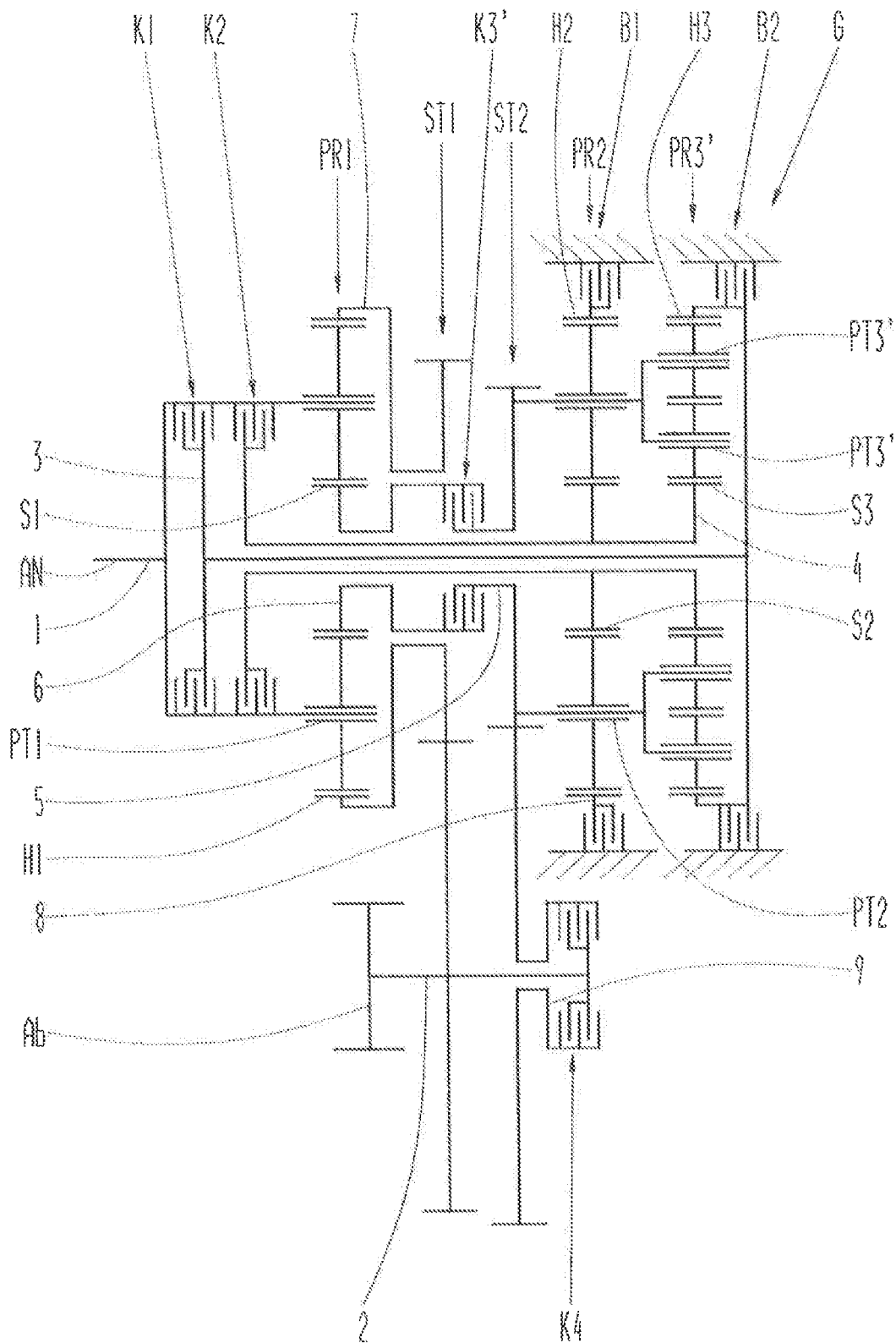
FIG. 4 is a schematic view of a fourth preferred embodiment of a transmission in accordance with the invention.

FIG. 4 schematically represents an additional variant of the transmission described in FIG. 3. The main structural difference between the variant described in FIG. 3 and the present variant is that, here, the third planetary gear set PR3' is designed as a positive planetary gear set. This in turn leads to some changes with respect to the interfaces or connections. The drive shaft 1, as described in FIG. 3, remains connectable to the third shaft 3 through the first clutch K1, but the third shaft 3 now further connects the second brake B2 to the ring gear H3 of the third planetary gear set PR3'. The sixth shaft 6 is also connected to the sun gear S1 of the first planetary gear set PR1, and is connectable to the fifth shaft 5 through the third clutch K3'. As before, the fifth shaft 5 also connects to the second spur pinion ST2 to the planetary carrier PT2 of the second planetary gear set PR2. The second spur pinion ST2 is connected to the ninth shaft 9, and the ninth shaft 9 is further connectable to the output shaft 2 through the fourth clutch K4. In contrast to the arrangement described in FIG. 3, the fifth shaft 5 now further connects the planetary carrier PT2 of the second planetary gear set PR2 to the planetary carrier PT3' of the third planetary gear set PR3'. The arrangement of the remaining components and elements corresponds to that described in FIG. 3. Moreover, the remaining interfaces or connections are identical to those of the arrangement described in FIG. 3.

Figure 5:
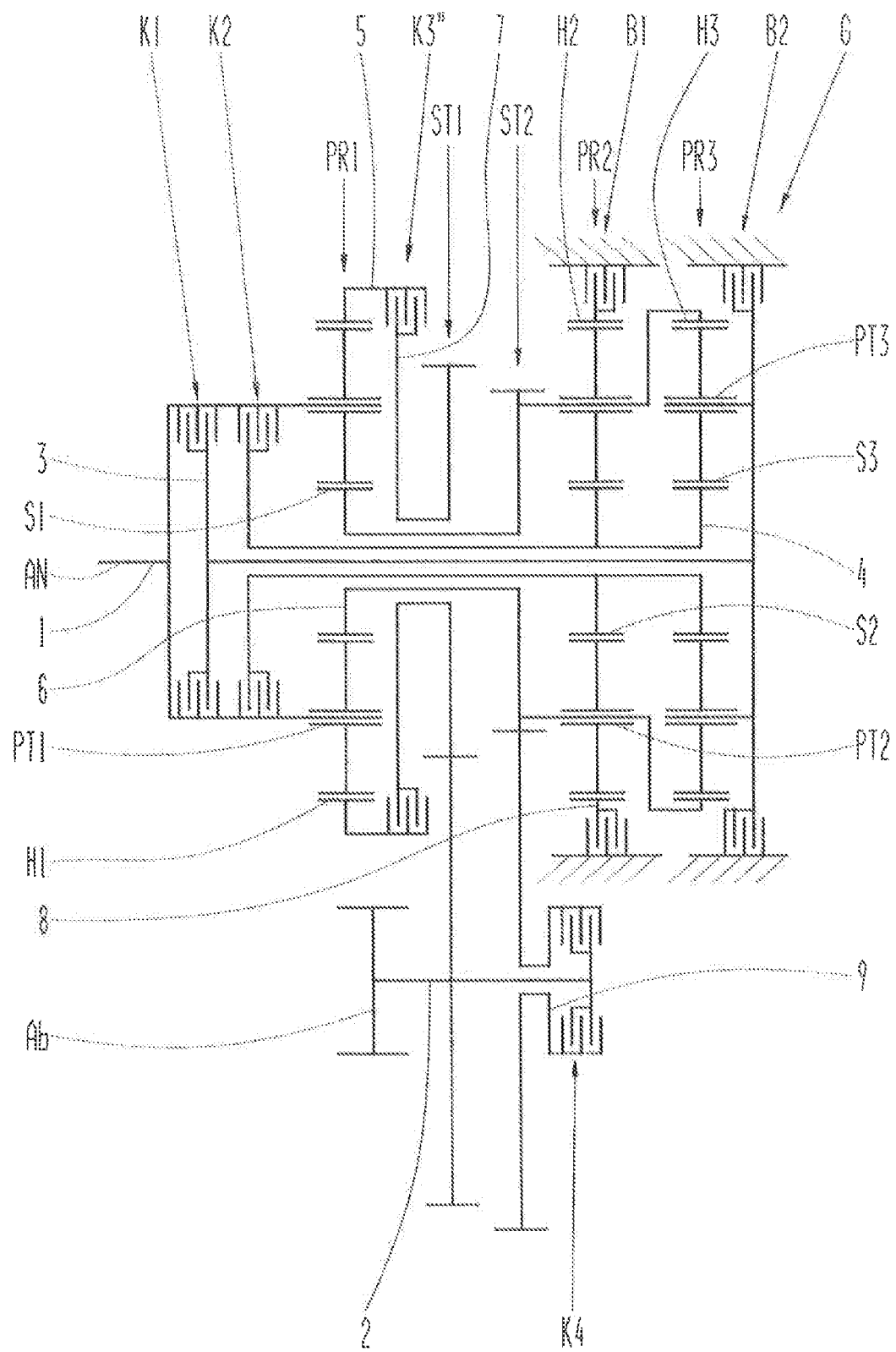
FIG. 5 is a schematic view of a fifth preferred embodiment of a transmission in accordance with the invention.

A fifth variant of the transmission described in FIG. 1 is shown in FIG. 5. Thereby, the drive shaft 1 is connectable to the third shaft 3 through the first clutch K1, whereas the third shaft 3 further connects the second brake B2 to the planetary carrier PT3 of the third planetary gear set PR3. Further, the drive shaft 1 is connectable to the fourth shaft 4 through the second clutch, while the fourth shaft 4 further connects the sun gear S2 of the second planetary gear set PR2 to the sun gear S3 of the third planetary gear set PR3. In addition, the drive shaft 1 is firmly connected to the planetary carrier PT1 of the first planetary gear set PR1. The sixth shaft 6, on the one hand, is connected to the sun gear S1 of the first planetary gear set PR1, and further connects the second spur pinion ST2 to the planetary carrier PT2 of the second planetary gear set PR2. The ninth shaft 9 is, on the one hand, connected to the second spur pinion ST2 and, on the other hand, connected to the output shaft 2 through the fourth clutch K4. The planetary carrier PT2 of the second planetary gear set PR2 is further connected to the ring gear H3 of the third planetary gear set PR3 through the sixth shaft 6. The fifth shaft 5 is, on the one hand, connected to the ring gear H1 of the first planetary gear set PR1 and, on the other hand, connectable to the seventh shaft 7 through the third clutch K3". The seventh shaft 7 is further connected to the first spur pinion ST1, and this is connected to the output shaft 2. The ring gear H2 of the second planetary gear set PR2 is connected to the first brake B1 through the eighth shaft 8. Each of the first planetary gear set PR1, the second planetary gear set PR2 and the third planetary gear set PR3 is designed as a negative planetary gear set.

Figure 6:
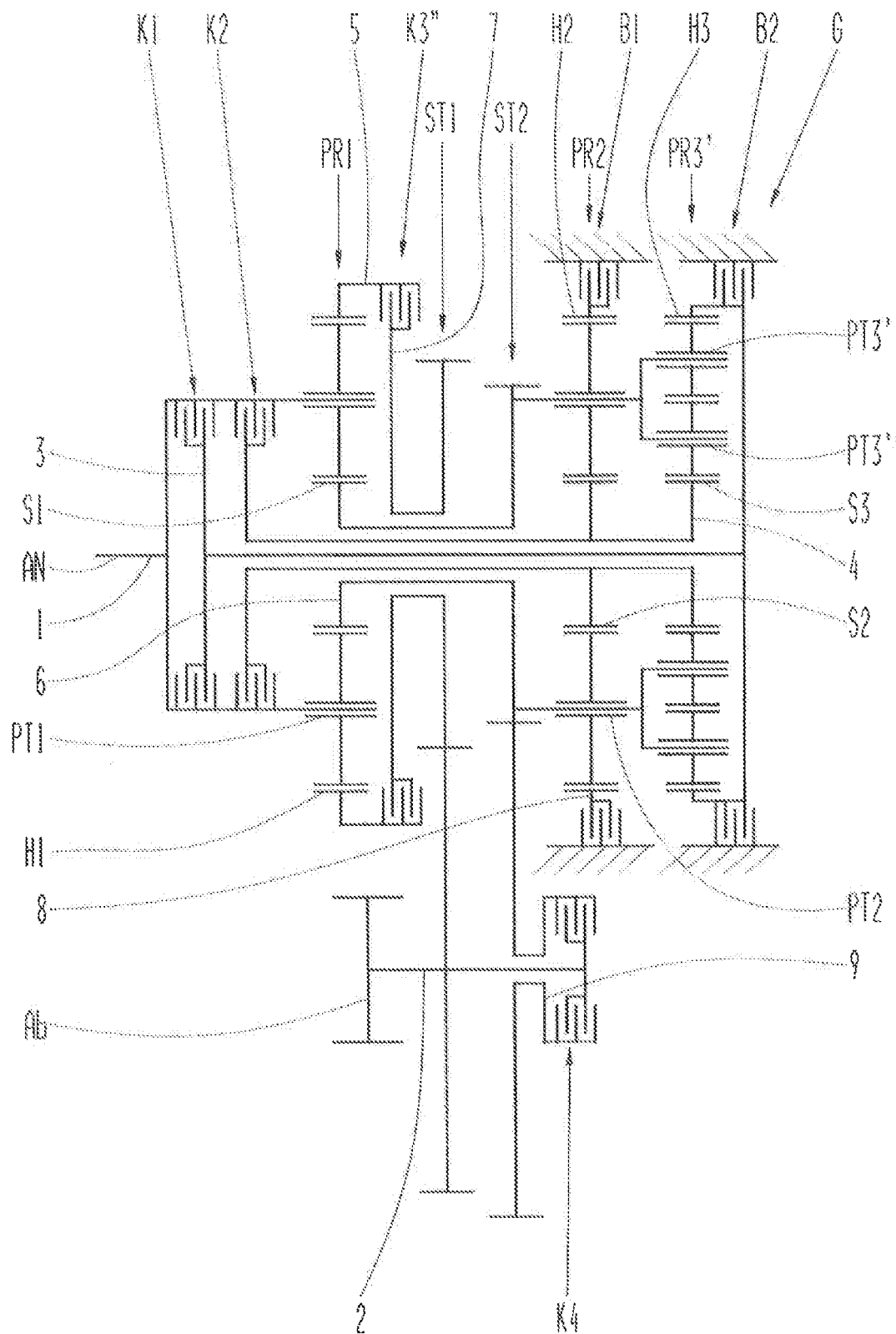
FIG. 6 is a schematic view of a sixth preferred embodiment of a transmission in accordance with the invention.

FIG. 6 shows a sixth variant of the transmission described in FIG. 1. Thereby, the arrangement of the elements and the connections or interfaces, as the case may be, is largely equivalent to that in FIG. 5. A significant difference is that the first planetary gear set PR1 and the second planetary gear set PR2 are designed as negative planetary gear sets, whereas the third planetary gear set PR3' is designed as a positive planetary gear set. This requires some changes in the connections or in the interfaces, as the case may be. Thereby, the drive shaft 1 is connectable to the third shaft 3 through the first clutch K1, while the third shaft 3 further connects the second brake B2 to the ring gear H3 of the third planetary gear set PR3'. Further, the drive shaft 1 is connectable to the fourth shaft 4 through the second clutch K2, while the fourth shaft 4 further connects the sun gear S2 of the second planetary gear set PR2 to the sun gear S3 of the planetary gear set PR3'. In addition, the drive shaft 1 is firmly connected to the planetary carrier PT1 of the first planetary gear set PR1. The sixth shaft 6 connects, on the one hand, the sun gear S1 of the first planetary gear set PR1 to the second spur pinion ST2 and, on the other hand, the planetary carrier PT2 of the second planetary gear set PR2 to the second spur pinion ST2. The ninth shaft 9 is, on the one hand, connected to the second spur pinion ST2 and, on the other hand, connectable to the output shaft 2 through the fourth clutch K4. In contrast to the arrangement described in FIG. 5, the planetary carrier PT2 of the second planetary gear set PR2 is further connected to the planetary carrier PT3' of the third planetary gear set PR3' through the sixth shaft 6. The arrangement of the additional elements of the gear set and its interfaces corresponds to the arrangement described in FIG. 5.

Figure 7:
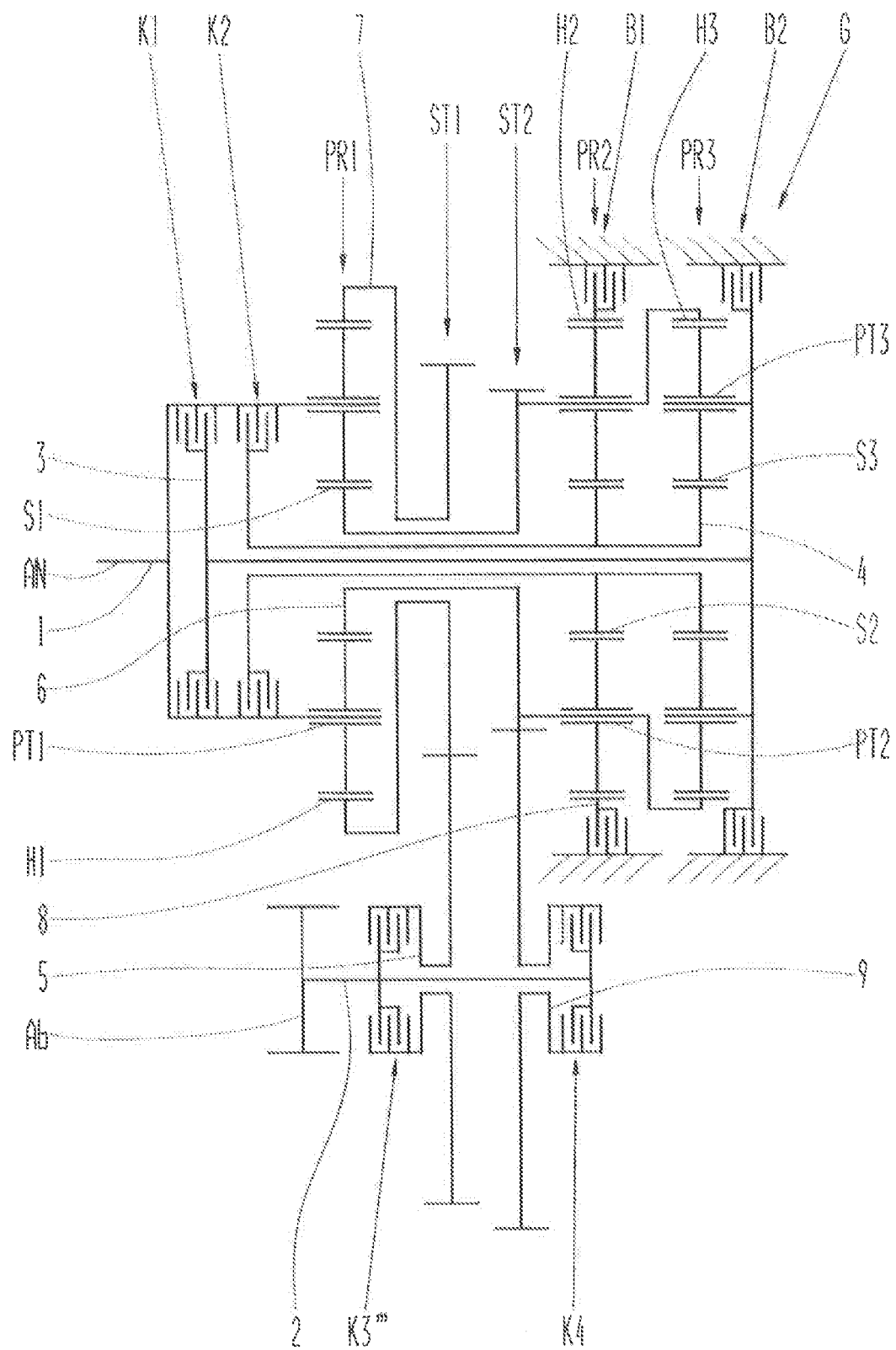
FIG. 7 is a schematic view of a seventh preferred embodiment of a transmission in accordance with the invention.

FIG. 7 shows an additional variant of the transmission described in FIG. 1. Thereby, the drive shaft 1 is connectable to the third shaft 3 through the first clutch K1, while the third shaft 3 connects the second brake B2 to the planetary carrier PT3 of the third planetary gear set PR3. Further, the drive shaft 1 is connectable to the fourth shaft 4 through the second clutch K2, while the fourth shaft 4 connects the sun gear S2 of the second planetary gear set PR2 to the sun gear S3 of the third planetary gear set PR3. In addition, the drive shaft 1 is firmly connected to the planetary carrier PT1 of the first planetary gear set PR1. The sun gear S1 of the first planetary gear set PR1 is connected to the second spur pinion ST2 through the sixth shaft 6. In addition, the sixth shaft 6 connects the second spur pinion ST2 to the planetary carrier PT2 of the second planetary gear set PR2. In addition, the sixth shaft 6 further connects the planetary carrier PT2 of the second planetary gear set PR2 to the ring gear H3 of the third planetary gear set PR3. The second spur pinion ST2 is further connected to the ninth shaft 9, whereas the ninth shaft 9 is connectable to the output shaft 2 through the fourth clutch K4. The seventh shaft 7 connects the ring gear H1 of the first planetary gear set PR1 to the first spur pinion ST1. The fifth shaft 5 is connectable, on the one hand, to the first spur pinion ST1 and, on the other hand, to the output shaft 2 through the third clutch K3. The eighth shaft 8 connects the ring gear H2 of the second planetary gear set PR2 to the first brake B1. In this embodiment, the first planetary gear set PR1, the second planetary gear set PR2 and the third planetary gear set PR3 are designed as negative planetary gear sets.

Figure 8:
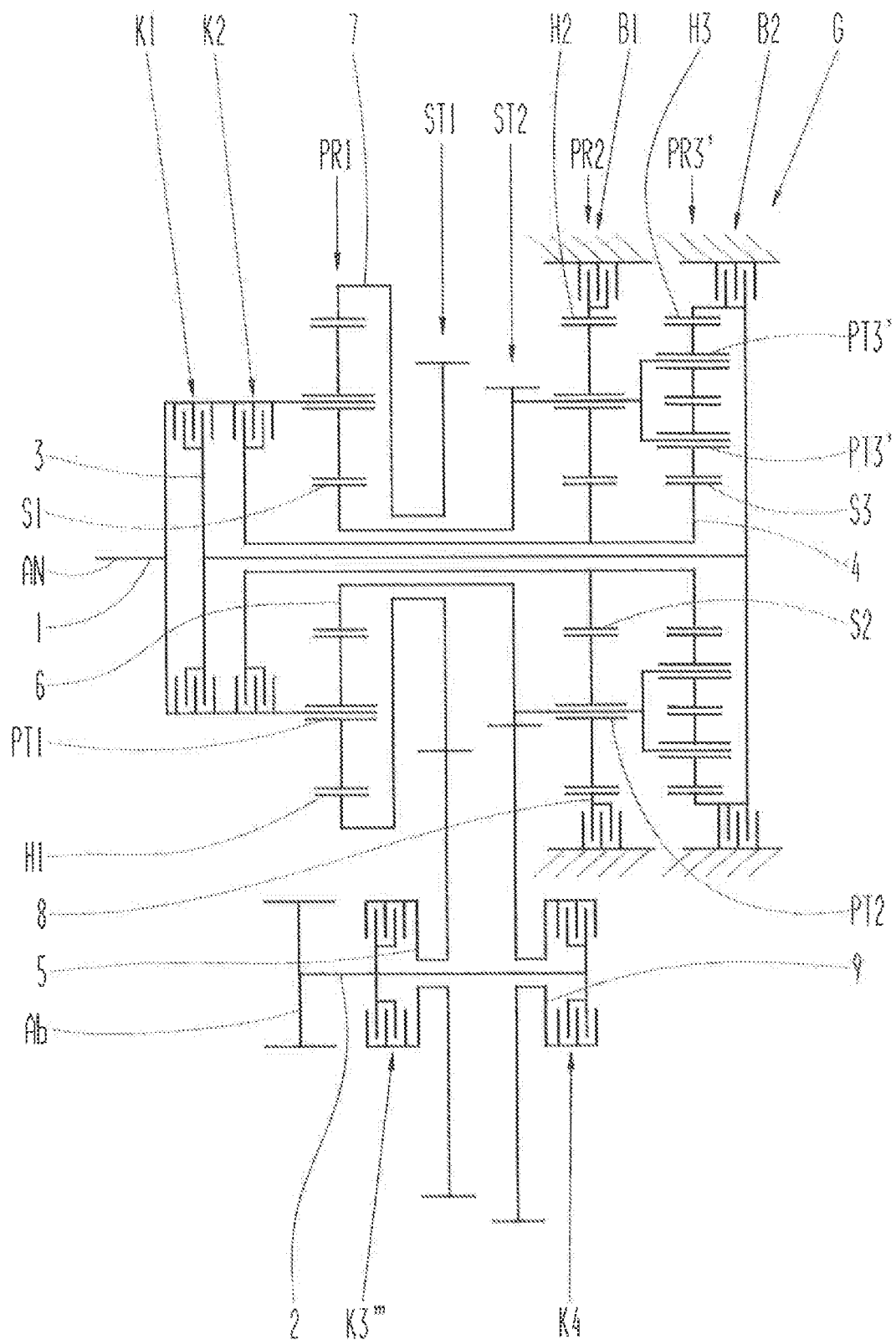
FIG. 8 is a schematic view of an eighth preferred embodiment of a transmission in accordance with the invention.

FIG. 8 shows an additional variant of the transmission described in FIG. 7. The arrangement of the elements and the interfaces differs from the variant described in FIG. 7 in that the first planetary gear set PR1 and the second planetary gear set PR2 are designed as negative planetary gear sets, and the third planetary gear set PR3' is designed as a positive planetary gear set. This results in the following differences with respect to the arrangement of the elements or interfaces, as the case may be. The drive shaft 1 is connectable to the third shaft 3 through the first clutch K1, while the third shaft 3 now connects the second brake B2 to the ring gear H3 of the third planetary gear set PR3'. The sixth shaft 6 also connects the sun gear S1 of the first planetary gear set PR1, on the one hand, to the second spur pinion ST2 and, on the other hand, to the planetary carrier PT2 of the second planetary gear set PR2. In addition, the ninth shaft 9 is further connected to the second spur pinion ST2, and is connectable to the output shaft 2 through the fourth clutch K4. In contrast to the arrangement described in FIG. 7, the sixth shaft 6 now further connects the planetary carrier PT2 of the second planetary gear set PR2 to the planetary carrier PT3' of the third planetary gear set PR3'. All additional arrangements of the components or interfaces are equivalent to the arrangement described in FIG. 7.

Figure 9:
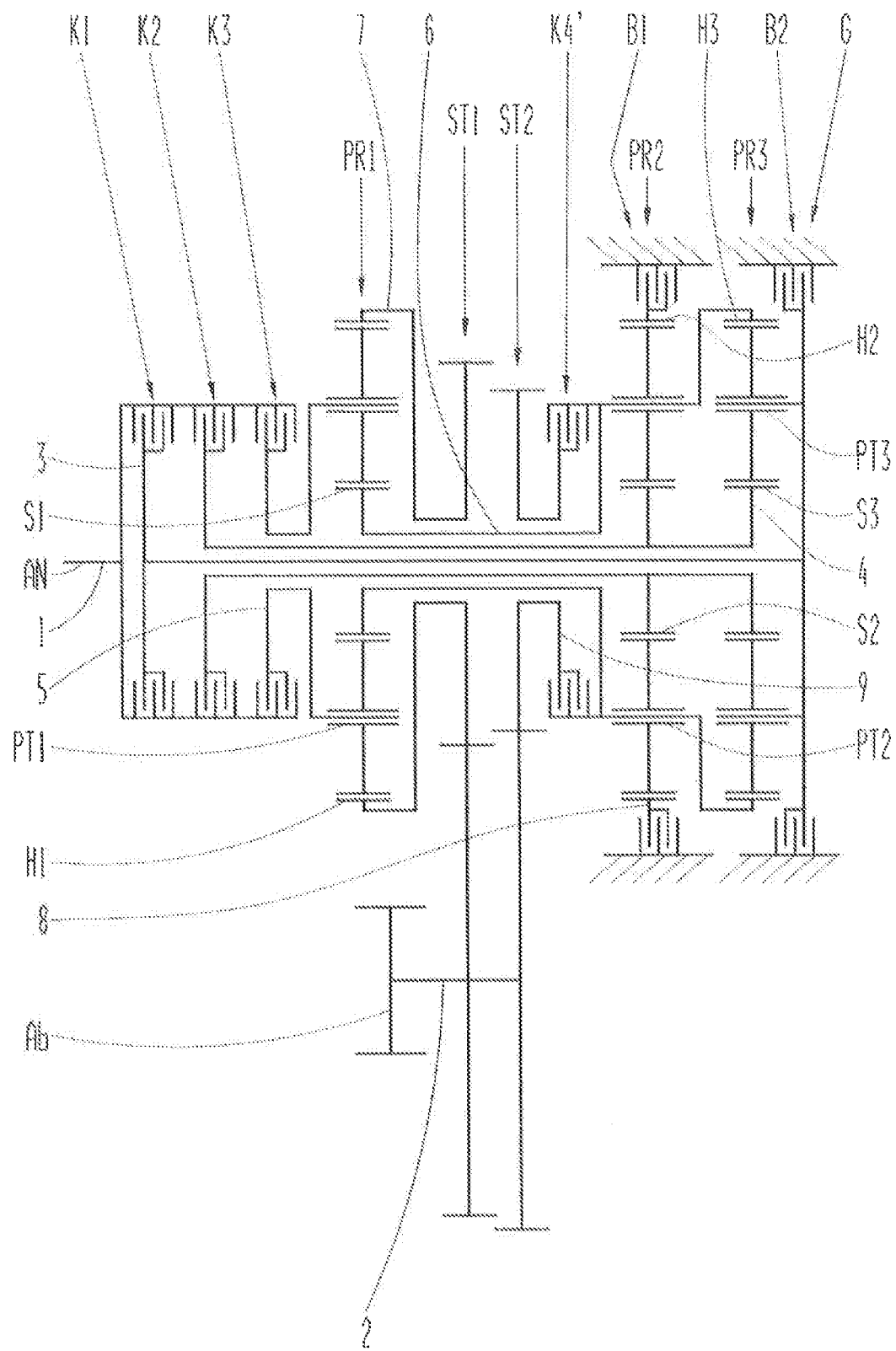
FIG. 9 is a schematic view of a ninth preferred embodiment of a transmission in accordance with the invention.

FIG. 9 shows an additional embodiment of the transmission described in FIG. 1. Thereby, the first planetary gear set PR1, the second planetary gear set PR2 and the third planetary gear set PR3 are designed as negative planetary gear sets. The drive shaft 1 is connectable to third shaft 3 through the first clutch K1, while the third shaft 3 connects the second brake B2 to the planetary carrier PT3 of the third planetary gear set PR3. Further, the drive shaft 1 is connectable to the fourth shaft 4 through the second clutch K2, while the fourth shaft 4 connects the sun gear S2 of the second planetary gear set PR2 to the sun gear S3 of the third planetary gear set PR3. The drive shaft 1 is also connectable to the fifth shaft 5 through the third clutch K3, whereas the fifth shaft 5 is also connected to the planetary carrier PT1 of the first planetary gear set PR1. The sixth shaft 6 connects the sun gear S1 of the first planetary gear set PR1 to the planetary carrier PT2 of the second planetary gear set PR2. In addition, the sixth shaft 6 is connectable to the ninth shaft 9 through the fourth clutch K4'. Further, the ninth shaft 9 is connected to the second spur pinion ST2, and this is further connected to the output shaft 2. The planetary carrier PT2 of the second planetary gear set PR2 is further connected to the ring gear H3 of the third planetary gear set PR3 through the sixth shaft 6. The seventh shaft 7 connects the ring gear H1 of the first planetary gear set PR1 to the first spur pinion ST1. In addition, the first spur pinion ST1 is connected to the output shaft 2. The eighth shaft 8 connects the ring gear H2 of the second planetary gear set PR2 to the first brake B1.

Figure 10:
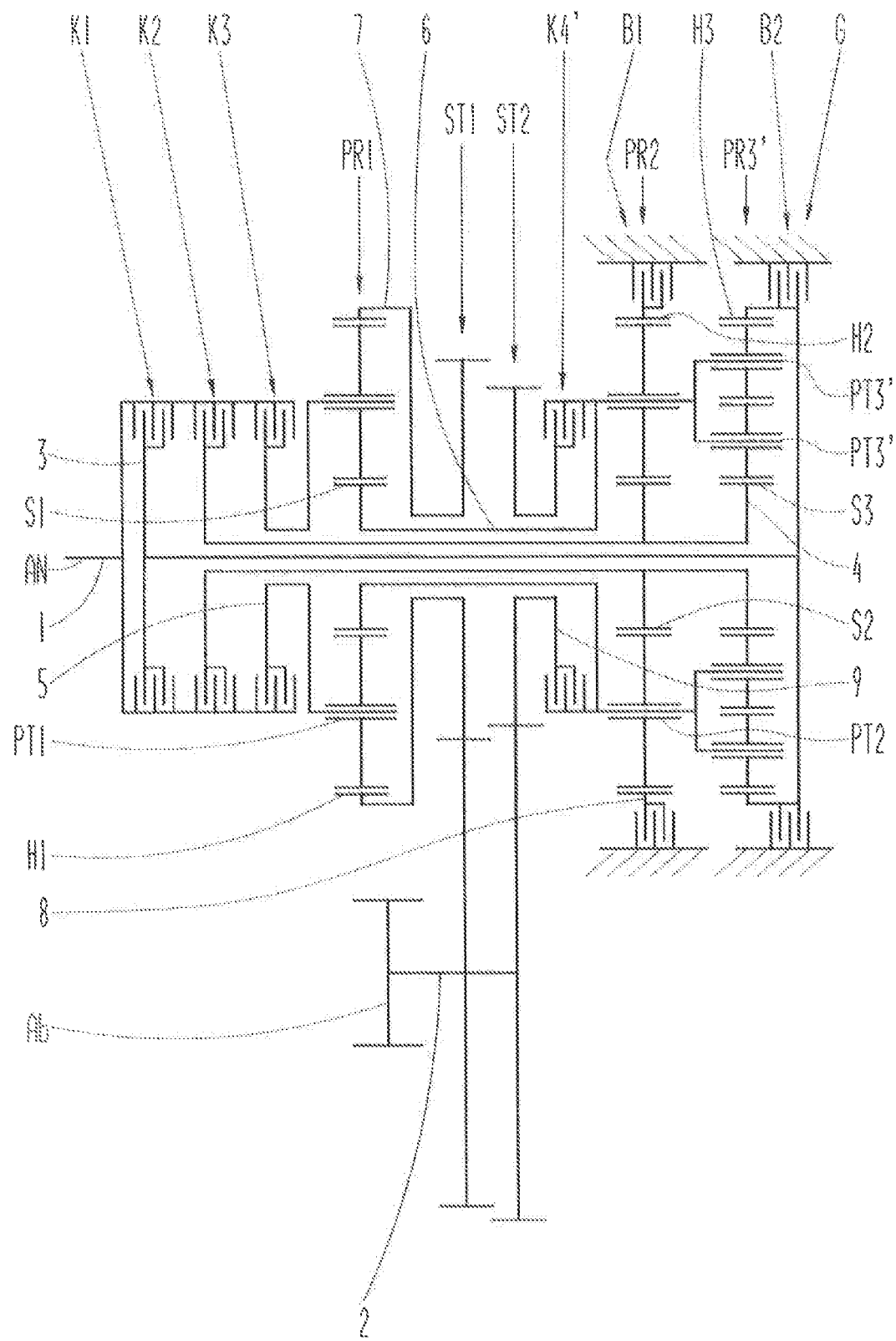
FIG. 10 is a schematic view of a tenth preferred embodiment of a transmission in accordance with the invention.

FIG. 10 shows an additional variant of the transmission described in FIG. 9. The arrangement of the elements and components along with their interfaces and connections is largely equivalent to the arrangement described in FIG. 9. The significant difference is that the first planetary gear set PR1 and the second planetary gear set PR2 are designed as negative planetary gear sets, and the third planetary gear set PR3' is designed as a positive planetary gear set. This results in differences in the connection, which are described below. The drive shaft 1 is further connectable to the third shaft 3 through the first clutch K1, while the third shaft 3 now connects the second brake B2 to the ring gear H3 of the third planetary gear set PR3'. Further, the sun gear S1 of the first planetary gear set PR1 is connected to the planetary carrier PT2 of the second planetary gear set PR2 through the sixth shaft 6. However, in contrast to the arrangement described in FIG. 9, the sixth shaft 6 also now connects the planetary carrier PT2 of the second planetary gear set PR2 to the planetary carrier PT3' of the third planetary gear set PR3'. All other arrangements and interfaces correspond to the arrangement described in FIG. 9.

In a table, FIG. 11 shows a shifting matrix of the transmission described in FIG. 1. By means of an X in the corresponding box, the shift element that is locked for the realization of the first to ninth forward gear and the reverse gear is made clear. In addition, three shifting alternatives for the fourth gear are indicated with the numbers 4-I, 4-II and 4-III.

The shifting states of the alternative embodiments of the third clutch K3', K3", K3''' are identical to the shifting states of the third clutch K3. The same applies to the shifting state of the alternative embodiment of the fourth clutch K4' and the shifting state of the fourth clutch K4. This means that, for example, the shifting states of the alternative embodiments of the third clutch K3', K3", K3''' are identical to the shifting states of the third clutch K3, and are defined in the table, for example, through the shifting state of the third clutch K3.

Furthermore, the transmission ratio of the respective gear is specified, whereas the first forward gear features a transmission ratio relationship of i=4.333, the second forward gear features a transmission ratio relationship of i=2.586, the third forward gear features a transmission ratio relationship of i=1.667, the fourth forward gear features a transmission ratio relationship of i=1.267, the fifth forward gear features a transmission ratio relationship of i=1.0, the sixth forward gear features a transmission ratio relationship of i=0.808, the seventh forward gear features a transmission ratio relationship of i=0.709, the eighth forward gear features a transmission ratio relationship of i=0.6 and the ninth forward gear features a transmission ratio relationship of i=0.496. Given the reversal of direction of the rotary movement, the reverse gear features a negative transmission ratio relationship of i=−3.167. Here, "transmission ratio" and "transmission ratio relationship" are synonymous.

The corresponding gear jumps of the forward gears can also be derived from the table. Under "gear jump," the quotient of the transmission ratios of the lower forward gear and the next higher forward gear is understood. Thereby, the gear jump from the first forward gear to the second forward gear features a value of $\phi$=1.675, the gear jump from the second forward gear to the third forward gear features a value of $\phi$=1.552, the gear jump from the third forward gear to the fourth forward gear features a value of $\phi$=1.316, the gear jump from the fourth forward gear to the fifth forward gear features a value of $\phi$=1.267, the gear jump from the fifth forward gear to the sixth forward gear features a value of $\phi$=1.237, the gear jump from the sixth forward gear to the seventh forward gear features a value of $\phi$=1.140, the gear jump from the seventh forward gear to the eighth forward gear features a value of $\phi$=1.182 and the gear jump from the ninth forward gear to the tenth forward gear features a value of $\phi$=1.210. The gear spread, as a quotient of the lowest forward gear and the highest forward gear, amounts to 8.741.

Modifications and variations can be made to the embodiments illustrated or described herein without departing from the scope and spirit of the invention as set forth in the appended claims.

The invention claimed is:

1. A transmission for a motor vehicle, the transmission comprising:
   a drive shaft (1);
   an output shaft (2);
   a housing (G);
   a first planetary gear set (PR1), a second planetary gear set (PR2) and a third planetary gear set (PR3, PR3'), wherein each planetary gear set (PR1, PR2, PR3, PR3') comprises a sun gear (S1, S2, S3), a planetary gear, a planetary carrier (PT1, PT2, PT3, PT3') and one ring gear (H1, H2, H3);
   six shift elements in the form of a first brake (B1), a second brake (B2), a first clutch (K1), a second clutch (K2), a third clutch (K3, K3', K3", K3'''), and a fourth clutch (K4, K4'), wherein the shift elements are selectively actuated to provide nine forward gears and one reverse gear through different transmission ratio relationships between the input shaft (1) and the drive shaft (2);
   the drive shaft (1) and the output shaft (2) arranged in a manner axially offset to each other;
   the drive shaft (1) connectable through the first clutch (K1) to the second brake (B2), and through the second clutch (K2) to the sun gear (S2) of the second planetary gear set (PR2) and to the sun gear (S3) of the third planetary gear set (PR3, PR3'); and
   the sun gear (S2) of the second planetary gear set (PR2) and the sun gear (S3) of the third planetary gear set (PR3, PR3') connected to each other.

2. The transmission according to claim 1, wherein a ring gear (H2) of the second planetary gear set (PR2) is connected to the first brake (B1).

3. The transmission according to claim 1, wherein each of the first planetary gear set (PR1), the second planetary gear set (PR2) and the third planetary gear set (PR3) is designed as a negative planetary gear set.

4. The transmission according to claim 1, wherein the first planetary gear set (PR1) and the second planetary gear set (PR2) are designed as negative planetary gear sets, and the third planetary gear set (PR3') is designed as a positive planetary gear set.

5. The transmission according to claim 3, wherein:
   (a) the drive shaft (1) is connectable to the planetary carrier (PT3) of the third planetary gear set (PR3) through the first clutch (K1);
   (b) the drive shaft (1) is connectable to the planetary carrier (PT1) of the first planetary gear set (PR1) through the third clutch (K3);
   (c) the sun gear (S1) of the first planetary gear set (PR1) is connected to a second spur pinion (ST2) and the planetary carrier (PT2) of the second planetary gear set (PR2);
   (d) the second spur pinion (ST2) is connectable to the output shaft (2) through the fourth clutch (K4);
   (e) the planetary carrier (PT2) of the second planetary gear set (PR2) is connected to the ring gear (H3) of the third planetary gear set (PR3); and
   (f) the ring gear (H1) of the first planetary gear set (PR1) is connected to a first spur pinion (ST1), and the first spur pinion (ST1) is connected to the output shaft (2).

6. The transmission according to claim 4, wherein:
   (a) the drive shaft (1) is connectable to the ring gear (H3) of the third planetary gear set (PR3') through the first clutch (K1);
   (b) the drive shaft (1) is connectable to the planetary carrier (PT1) of the first planetary gear set (PR1) through the third clutch (K3);
   (c) the sun gear (S1) of the first planetary gear set (PR1) is connected to a second spur pinion (ST2) and the planetary carrier (PT2) of the second planetary gear set (PR2);
   (d) the second spur pinion (ST2) is connectable to the output shaft (2) through the fourth clutch (K4);
   (e) the planetary carrier (PT2) of the second planetary gear set (PR2) is connected to the planetary carrier (PT3') of the third planetary gear set (PR3');
   (f) the ring gear (H1) of the first planetary gear set (PR1) is connected to a first spur pinion (ST1); and
   (g) the first spur pinion (ST1) is connected to the drive shaft (2).

7. The transmission according to claim 3, wherein:
   (a) the drive shaft (1) is connectable to the planetary carrier (PT3) of the third planetary gear set (PR3) through the first clutch (K1);
   (b) the drive shaft (1) is connected to the planetary carrier (PT1) of the first planetary gear set (PR1);
   (c) the sun gear (S1) of the first planetary gear set (PR1) is connectable to a second spur pinion (ST2) and the planetary carrier (PT2) of the second planetary gear set (PR2) through the third clutch (K3');
   (d) the second spur pinion (ST2) is connectable to the drive shaft (2) through the fourth clutch (K4);
   (e) the planetary carrier (PT2) of the second planetary gear set (PR2) is connected to the ring gear (H3) of the third planetary gear set (PR3); and
   (f) the ring gear (H1) of the first planetary gear set (PR1) is connected to a first spur pinion (ST1), and the first spur pinion (ST1) is connected to the drive shaft.

8. The transmission according to claim 4, wherein:
   (a) the drive shaft (1) is connectable to the ring gear (H3) of the third planetary gear set (PR3') through the first clutch (K1);
   (b) the drive shaft (1) is connected to the planetary carrier (PT1) of the first planetary gear set (PR1);
   (c) the sun gear (S1) of the first planetary gear set (PR1) is connectable to a second spur pinion (ST2) and the planetary carrier (PT2) of the second planetary gear set (PR2) through the third clutch (K3');

(d) the second spur pinion (ST2) is connectable to the output shaft (2) through the fourth clutch (K4);
(e) the planetary carrier (PT2) of the second planetary gear set (PR2) is connected to the planetary carrier (PT3') of the third planetary gear set (PR3');
(f) the ring gear (H1) of the first planetary gear set (PR1) is connected to a first spur pinion (ST1); and
(g) the first spur pinion (ST1) is connected to the output shaft (2).

9. The transmission according to claim 3, wherein:
(a) the drive shaft (1) is connectable to the planetary carrier (PT3) of the third planetary gear set (PR3) through the first clutch (K1);
(b) the drive shaft (1) is connected to the planetary carrier (PT1) of the first planetary gear set (PR1);
(c) the sun gear (S1) of the first planetary gear set (PR1) is connected to a second spur pinion (ST2) and the planetary carrier (PT2) of the second planetary gear set (PR2);
(d) the second spur pinion (ST2) is connectable to the output shaft (2) through the fourth clutch (K4);
(e) the planetary carrier (PT2) of the second planetary gear set (PR2) is connected to the ring gear (H3) of the third planetary gear set (PR3);
(f) the ring gear (H1) of the first planetary gear set (PR1) is connectable to a first spur pinion (ST1) though the third clutch (K3"); and
(g) the first spur pinion (ST1) is connected to the output shaft (2).

10. The transmission according to claim 4, wherein:
(a) the drive shaft (1) is connectable to the ring gear (H3) of the third planetary gear set (PR3') through the first clutch (K1);
(b) the drive shaft (1) is connected to the planetary carrier (PT1) of the first planetary gear set (PR1);
(c) the sun gear (S1) of the first planetary gear set (PR1) is connected to a second spur pinion (ST2) and the planetary carrier (PT2) of the second planetary gear set (PR2);
(d) the second spur pinion (ST2) is connectable to the output shaft (2) through the fourth clutch (K4);
(e) the planetary carrier (PT2) of the second planetary gear set (PR2) is connected to the planetary carrier (PT3') of the third planetary gear set (PR3');
(f) the ring gear (H1) of the first planetary gear set (PR1) is connectable to a first spur pinion (ST1) through the third clutch (K3"); and
(g) the first spur pinion (ST1) is connected to the output shaft (2).

11. The transmission according to claim 3, wherein:
(a) the drive shaft (1) is connectable to the planetary carrier (PT3) of the third planetary gear set (PR3) through the first clutch (K1);
(b) the drive shaft (1) is connected to the planetary carrier (PT1) of the first planetary gear set (PR1);
(c) the sun gear (S1) of the first planetary gear set (PR1) is connected to a second spur pinion (ST2) and the planetary carrier (PT2) of the second planetary gear set (PR2);
(d) the second spur pinion (ST2) is connectable to the output shaft (2) through the fourth clutch (K4);
(e) the planetary carrier (PT2) of the second planetary gear set (PR2) is connected to the ring gear (H3) of the third planetary gear set (PR3);
(f) the ring gear (H1) of the first planetary gear set (PR1) is connected to a first spur pinion (ST1); and
(g) the first spur pinion (ST1) is connectable to the output shaft (2) through the third clutch (K3''').

12. The transmission according to claim 4, wherein:
(a) the drive shaft (1) is connectable to the ring gear (H3) of the third planetary gear set (PR3') through the first clutch (K1);
(b) the drive shaft (1) is connected to the planetary carrier (PT1) of the first planetary gear set (PR1);
(c) the sun gear (S1) of the first planetary gear set (PR1) is connected to a second spur pinion (ST2) and the planetary carrier (PT2) of the second planetary gear set (PR2);
(d) the second spur pinion (ST2) is connectable to the output shaft (2) through the fourth clutch (K4);
(e) the planetary carrier (PT2) of the second planetary gear set (PR2) is connected to the planetary carrier (PT3') of the third planetary gear set (PR3');
(f) the ring gear (H1) of the first planetary gear set (PR1) is connected to a first spur pinion (ST1); and
(g) the first spur pinion (ST1) is connectable to the output shaft (2) through the third clutch (K3''').

13. The transmission according to claim 3, wherein:
(a) the drive shaft (1) is connectable to the planetary carrier (PT3) of the third planetary gear set (PR3) through the first clutch (K1);
(b) the drive shaft (1) is connectable to the planetary carrier (PT1) of the first planetary gear set (PR1) through the third clutch (K3);
(c) the sun gear (S1) of the first planetary gear set (PR1) is connected to the planetary carrier (PT2) of the second planetary gear set (PR2), and is connectable to a second spur pinion (ST2) through the fourth clutch (K4');
(d) the second spur pinion (ST2) is connected to the output shaft (2);
(e) the planetary carrier (PT2) of the second planetary gear set (PR2) is connected to the ring gear (H3) of the third planetary gear set (PR3);
(f) the ring gear (H1) of the first planetary gear set (PR1) is connected to a first spur pinion (ST1); and
(g) the first spur pinion (ST1) is connected to the output shaft (2).

14. The transmission according to claim 4, wherein:
(a) the drive shaft (1) is connectable to the ring gear (H3) of the third planetary gear set (PR3') through the first clutch (K1);
(b) the drive shaft (1) is connectable to the planetary carrier (PT1) of the first planetary gear set (PR1) through the third clutch (K3);
(c) the sun gear (S1) is connected to the planetary carrier (PT2) of the second planetary gear set (PR2), and is connected to a second spur pinion (ST2) through the fourth clutch (K4');
(d) the second spur pinion (ST2) is connected to the output shaft (2);
(e) the planetary carrier (PT2) of the second planetary gear set (PR2) is connected to the planetary carrier (PT3') of the third planetary gear set (PR3');
(f) the ring gear (H1) of the first planetary gear set (PR1) is connected to a first spur pinion (ST1); and
(g) the first spur pinion (ST1) is connected to the output shaft (2).

15. The transmission according to claim 1, wherein:
(a) the first forward gear is represented by the locked first brake (B1), the locked second clutch (K2 and the locked fourth clutch (K4, K4');

(b) the second forward gear is represented by the locked first brake (B1), the locked first clutch (K1) and the locked fourth clutch (K4, K4');
(c) the third forward gear is represented by the locked first clutch (K1), the locked second clutch (K2) and the locked fourth clutch (K4, K4');
(d) the fourth forward gear is represented by one of:
 (1) the locked second clutch (K2), the locked third clutch (K3, K3', K3", K3''') and the locked fourth clutch (K4, K4');
 (2) the locked second brake (B2), the locked third clutch (K3, K3', K3", K3''') and the locked fourth clutch (K4, K4');
 (3) the locked first brake (B1), the locked third clutch (K3, K3', K3", K3''') and the locked fourth clutch (K4, K4');
 (4) the locked first clutch (K1), the locked third clutch (K3, K3', K3", K3''') and the locked fourth clutch (K4, K4');
(e) the fifth forward gear is represented by the locked first clutch (K1), the locked second clutch (K2) and the locked third clutch (K3, K3', K3", K3''');
(f) the sixth forward gear is represented by the locked first brake (61), the locked first clutch (K1) and the locked third clutch (K3, K3', K3", K3''');
(g) the seventh forward gear is represented by the locked first brake (B1), the locked second clutch (K2) and the locked third clutch (K3, K3', K3", K3''');
(h) the eighth forward gear is represented by the locked first brake (B1), the locked second brake (B2) and the locked third clutch (K3, K3', K3", K3''');
(i) the ninth forward gear is represented by the locked second brake (B2), the locked second clutch (K2) and the locked third clutch (K3, K3', K3", K3'''); and
(j) the reverse gear is represented by the locked second brake (B2), the locked second clutch (K2) and the locked fourth clutch (K4, K4').

16. A method for operating the transmission according to claim 1, comprising locking three shift elements in each gear, and for a gear change to an adjacent higher gear or to an adjacent lower gear, closing exactly one previously open shift element and opening exactly one previously locked shift element.

* * * * *